(12) United States Patent
Tsan

(10) Patent No.: US 6,371,571 B1
(45) Date of Patent: Apr. 16, 2002

(54) ADJUSTABLE ECCENTRIC WHEEL HUB ASSEMBLY

(75) Inventor: Hsi-Tsuan Tsan, No. 3, Alley 169, Lane Guang-Hun, Guang-Yun Ts'un, Yeong-Jinq Hsiang, Chang-Hua Hsien (TW)

(73) Assignees: Hsi-Tsuan Tsan; Yen-Chun Chiu, both of (TW)

( * ) Notice: Subject to any disclaimer, the term of this patent is extended or adjusted under 35 U.S.C. 154(b) by 0 days.

(21) Appl. No.: 09/695,984

(22) Filed: Oct. 26, 2000

(51) Int. Cl.$^7$ .......................... B60B 27/00; B62M 1/00
(52) U.S. Cl. .................. 301/110.5; 301/1; 280/229
(58) Field of Search .................. 301/1, 5.1, 110.5; 280/229

(56) References Cited

U.S. PATENT DOCUMENTS

| | | | | |
|---|---|---|---|---|
| 3,717,361 A | * | 2/1973 | Vanderpool | 280/229 |
| 4,602,822 A | * | 7/1986 | Kim et al. | 301/1 |
| 4,755,005 A | * | 7/1988 | Tsai | 301/1 |
| 5,249,847 A | * | 10/1993 | Lee | 301/105.1 |
| 6,186,918 B1 | * | 2/2001 | Yoo | 280/229 X |

* cited by examiner

*Primary Examiner*—Russell D. Stormer
(74) *Attorney, Agent, or Firm*—Donald C. Casey, Esq.

(57) ABSTRACT

An adjustable eccentric wheel hub assembly includes a wheel hub having an eccentric through hole, a core member mounted in the wheel hub, an axle mounted in an eccentric through hole of the core member, and an adjustment wheel mounted on the axle tube and controlled to lock/unlock the core member, enabling the axle to be set in the center of the wheel hub for enabling the bicycle in which the adjustable eccentric wheel hub assembly is installed to be moved horizontally forwards, or in an eccentric position relative to the wheel hub for enabling the bicycle to be moved alternatively up and down when running.

1 Claim, 7 Drawing Sheets

ADJUSTABLE ECCENTRIC WHEEL HUB ASSEMBLY

BACKGROUND OF THE INVENTION

The present invention relates to an adjustable eccentric wheel hub assembly and, more particularly, to such an adjustable eccentric wheel hub assembly, which is used in a bicycle and adjusted to let the wheel of the bicycle be rotated eccentrically.

The wheels of a bicycle are constantly turned about a fixed center. U.S. Pat. No. 6,024,367, equivalent to Taiwan Patent #143641, issued to the present inventor, discloses a stepless bicycle eccentric arrangement, which enables the bicycle to oscillate alternatively up and down when running. This design is functional, however it is complicated. Because this design is comprised of a big number of parts, its manufacturing cost is high.

SUMMARY OF THE INVENTION

The invention has been accomplished under the circumstances in view. It is one object of the present invention to provide an adjustable eccentric wheel hub assembly, which enables the bicycle to alternatively oscillate up and down when running. It is another object of the present invention to provide an adjustable eccentric wheel hub assembly, which has a simple structure practical for mass production. The adjustable eccentric wheel hub assembly of the present invention comprises a wheel hub having an eccentric through hole, a core member mounted in the wheel hub, an axle mounted in an eccentric through hole of the core member, and an adjustment wheel mounted on the axle tube and controlled to lock/unlock the core member, enabling the axle to be set in the center of the wheel hub for enabling the bicycle in which the adjustable eccentric wheel hub assembly is installed to be moved horizontally forwards, or in an eccentric position relative to the wheel hub for enabling the bicycle to be moved alternatively up and down when running.

DETAILED DESCRIPTION OF THE PREFERRED EMBODIMENT

Figure 1:
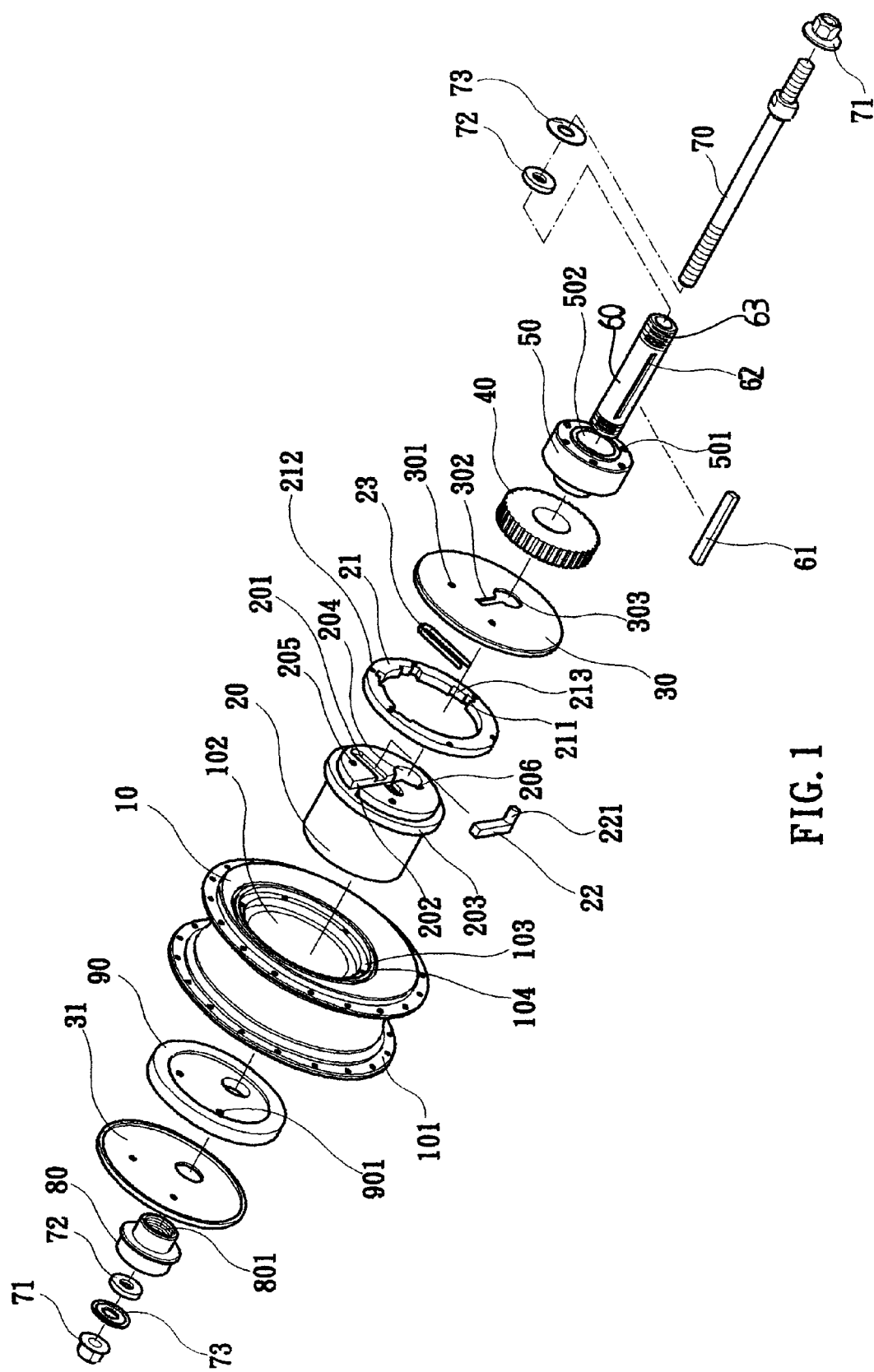
FIG. 1 is an exploded view of an adjustable eccentric wheel hub assembly according to the present invention.
Figure 2:
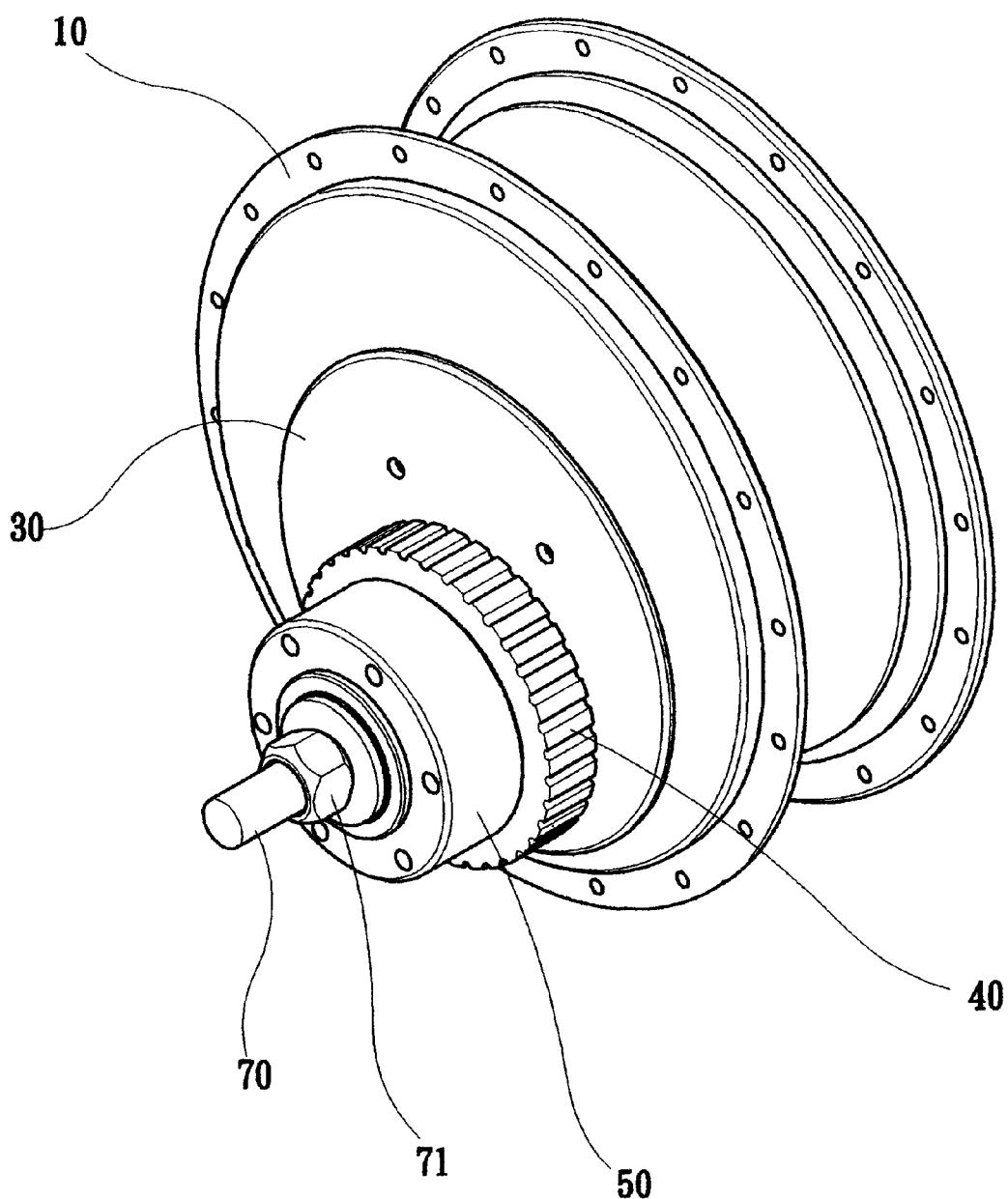
FIG. 2 is an elevational view of the adjustable eccentric wheel hub assembly according to the present invention.
Figure 3C:
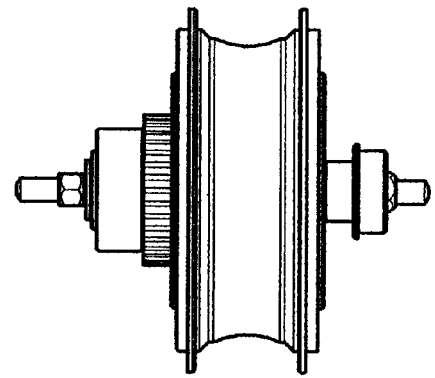
FIGS. 3A, 3B and 3C illustrate the outer appearance of the adjustable eccentric wheel hub assembly according to the present invention when viewed from different sides.
Figure 3A:
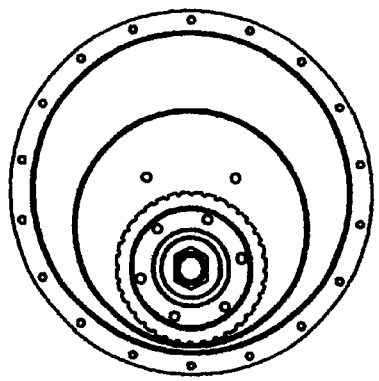
Figure 3B:
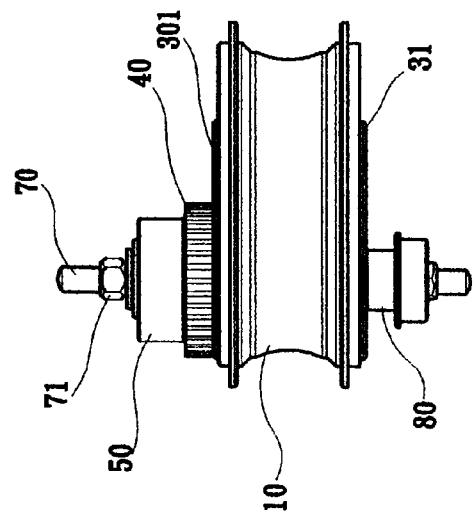
Figure 4:
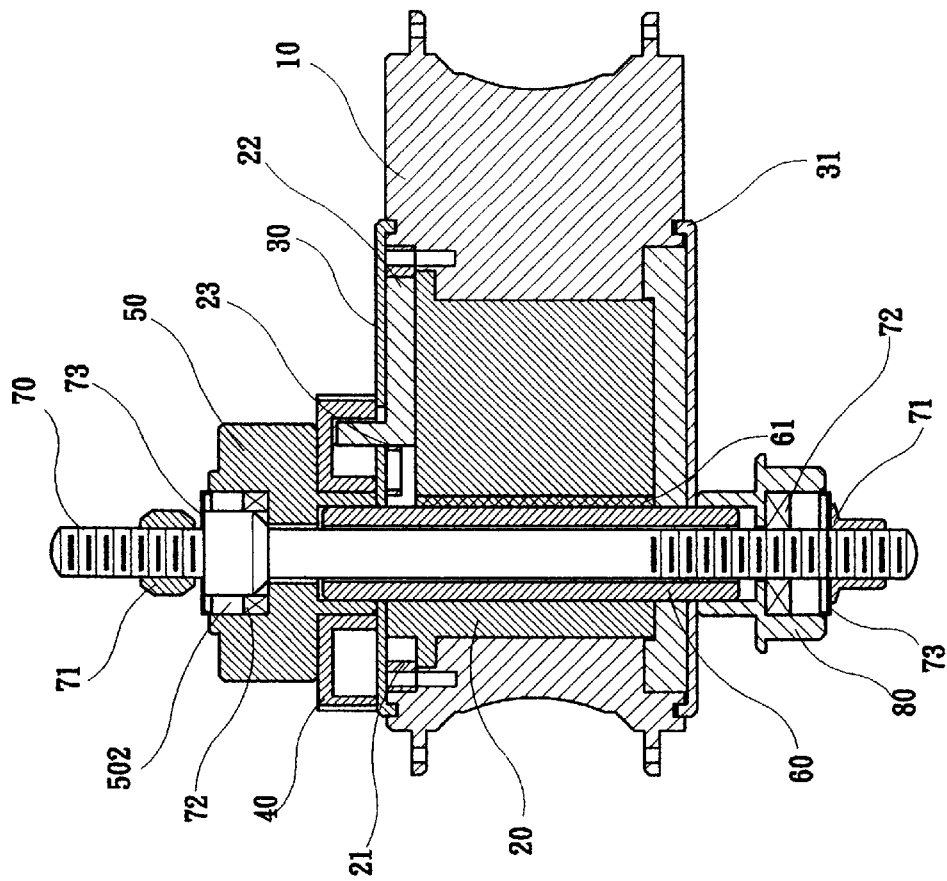
FIG. 4 is a longitudinal sectional view of the adjustable eccentric wheel hub assembly according to the present invention.

Referring to FIGS. from 1 through 4, an adjustable eccentric vehicle hub assembly is generally comprised of a wheel hub 10, a core member 20, a stop ring 21, a stop block 22, a spring plate 23, a right dust cover 30, an axle tube 60, a key 61, an adjustment wheel 40, a first axle bush 50, an axle 70, a core cap 90, a left dust cover 31, and a second axle bush 80.

The wheel hub 10 holds the core member 20, the stop ring 21, the stop block 22, the spring plate 23, the core cap 90, the axle tube 60 and the key 61 on the inside, comprising two outward mounting flanges 101 raised around the periphery thereof at two sides and adapted for fastening to a vehicle wheel, an eccentrically axially extended, stepped through hole 102, the stepped through hole 102 defining a first step and a second step, six mounting holes 104 equiangularly spaced on the first step of the stepped through hole 102, and two annular grooves 103 respectively disposed at front and rear sides thereof around the through hole 102. The core member 20 is a cylindrical member matching the stepped through hole 102 of the wheel hub 10, comprising a through hole 204 axially eccentrically extended through the two opposite end walls thereof, a locating groove 206 axially extended through the two opposite end walls and disposed in communication with the through hole 204, an outward flange 203 raised around the periphery near one end thereof, which is stopped at the second step in the stepped through hole 102 of the wheel hub 10 after insertion of the core member 20 in the stepped through hole 102, a first slot 201 and a second slot 202 respectively formed on one end wall, and a plurality of mounting holes 205 axially extended through the two opposite end walls. The first slot 201 cuts perpendicularly through the second slot 202. The second slot 202 extends radially from the through hole 204. The stop block 22 is slidably mounted in the second slot 202 of the core member 20, having a projecting rod 221 perpendicularly extended from one end thereof. The spring plate 23 is a U-shaped metal spring mounted in the first slot 201 of the core member 20. The stop ring 21 is supported on the outward flange 203 of the core member 20, comprising four recessed portions 213 equiangularly spaced around the inner diameter thereof, four axial grooves 211 respectively disposed in the recessed portions 213, and six axially extended mounting holes 212 respectively fastened to the mounting holes 104 of the wheel hub 10 by screws. The right dust cover 30 is press-fitted into one annular groove 103 of the wheel hub 10 to hold down the stop ring 21 on the core member 20, comprising an eccentric hole 303 aimed at the through hole 204 of the core member 20, a slot 302 extended from the eccentric hole 303 and aimed at the second slot 202 of the core member 20, and a plurality of mounting holes 301 respectively fastened to the mounting holes 205 of the core member 20 by screws. The axle tube 60 is inserted through the eccentric hole 303 of the right dust cover 30 and the through hole 204 of the core member 20, comprising two outer threads 63 at two distal ends thereof, and a longitudinal key slot 62. The key 61 is mounted in the longitudinal key slot 62 to secure the axle sleeve 60 in place. The adjustment wheel 40 is mounted around the axle tube 60 and supported on the right dust cover 30, comprising a guide block 41 on the inside. The periphery of the adjustment wheel 40 is toothed. The first axle bush 50 is threaded onto one outer thread 63 of the axle tube 60 and partially engaged into the inner diameter of the adjustment wheel 40, comprising six equiangularly spaced mounting holes 501 adapted for fastening to the disk brake of the bicycle in which the adjustable eccentric wheel hub assembly is installed, and an axle bearing chamber 502 at one end adapted to hold a ball bearing. The axle 70 is inserted through the axle tube 60. The core cap 90 is mounted around the axle tube 60 and covered on one end of the core member 20, comprising a plurality of mounting holes 901 respectively fastened to the mounting holes 205 of the core member 20. The left dust cover 31 is mounted around the axle sleeve 60 and press-fitted into one annular groove 103 of the wheel hub 10, and then fixedly fastened to the mounting holes 205 of the core member 20. The second axle bush 80 comprises an inner thread 801 threaded onto one outer thread 63 of the axle tube 60. Further, two axle bearings 72 are respectively mounted in the axle bearing chamber 501 of the first axle bush 50 and the axle bearing chamber (not shown) of the second axle bush 80, and then two washers 73 are respectively mounted on the axle 70 and attached to the axle bearings 72, and then two nuts 71 are respectively threaded onto the threaded opposite ends of the axle 70 to secure the aforesaid parts of the adjustable eccentric wheel hub assembly together.

Figure 5:
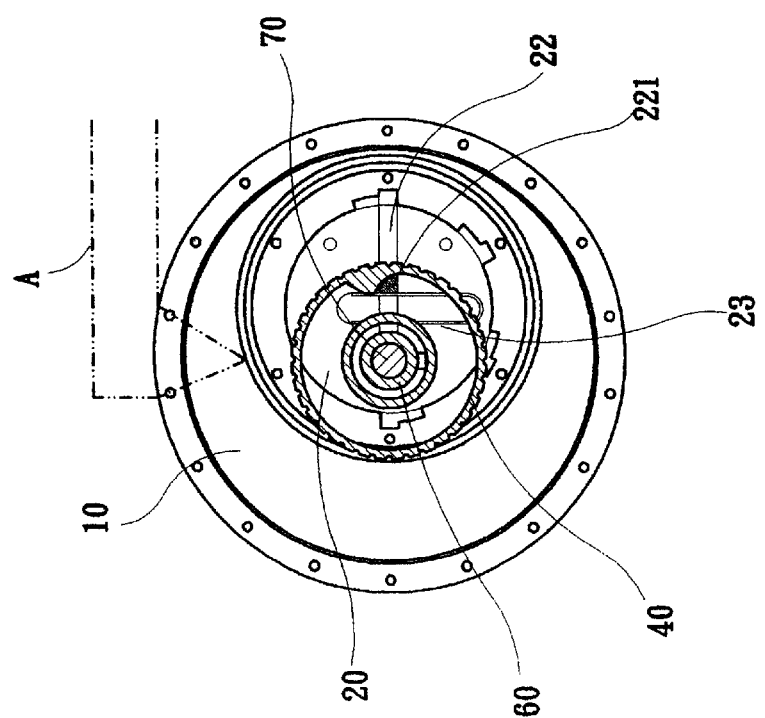
FIG. 5 is a cross sectional view of the adjustable eccentric wheel hub assembly according to the present invention.
Figure 6A:
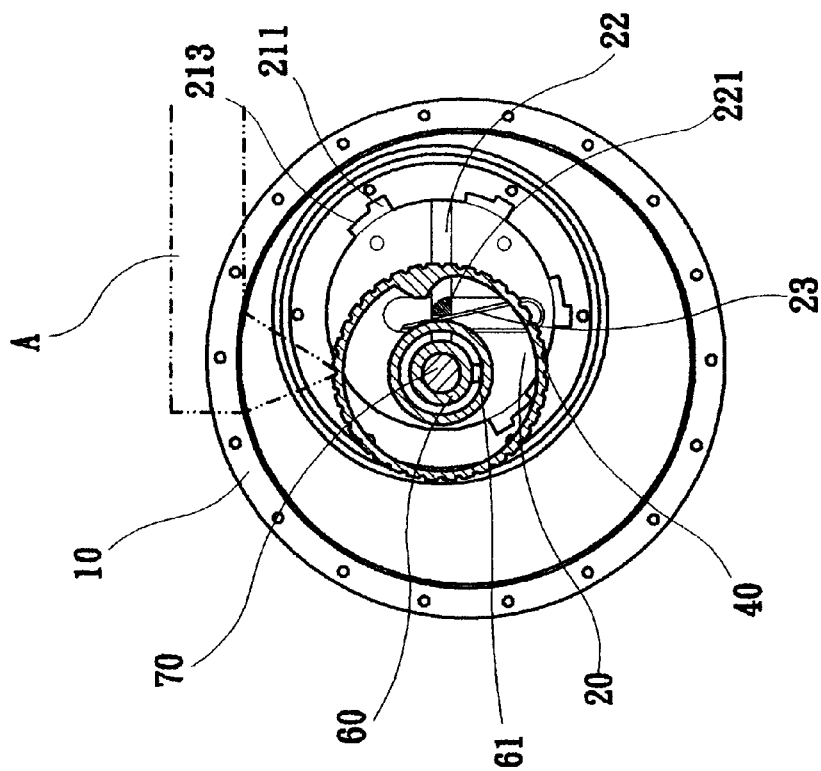
FIGS. 6A~6D illustrate the adjustment of the eccentric distance according to the present invention.
Figure 6B:
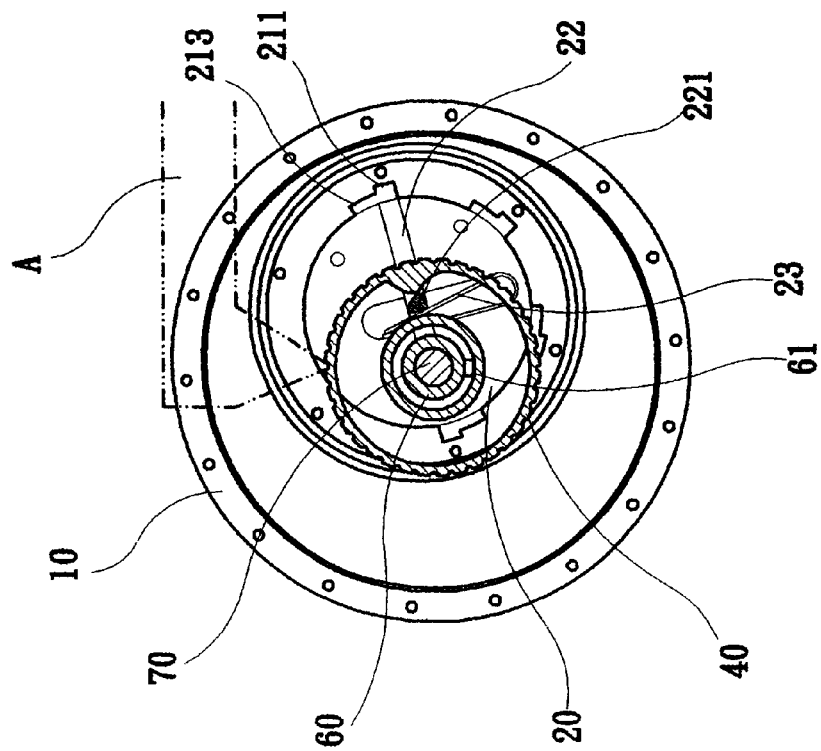
Figure 6D:
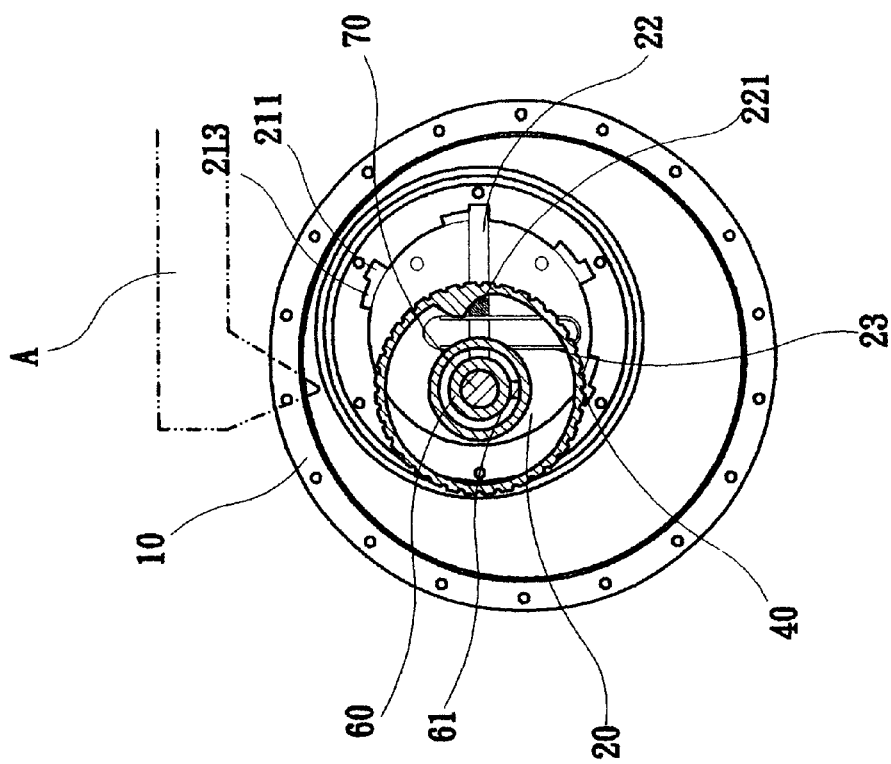
Figure 6C:
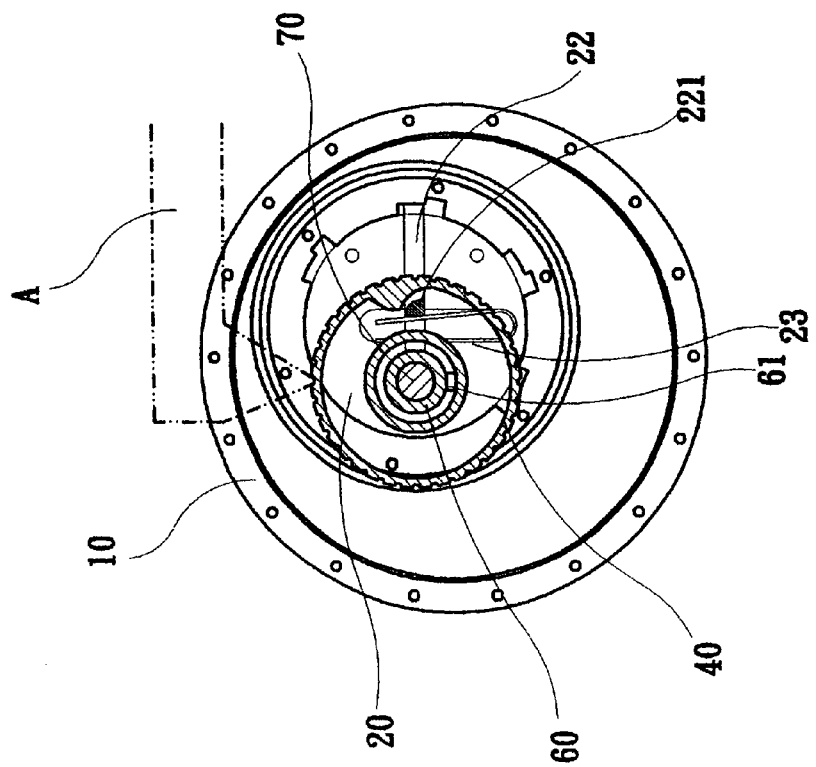
Figure 7B:
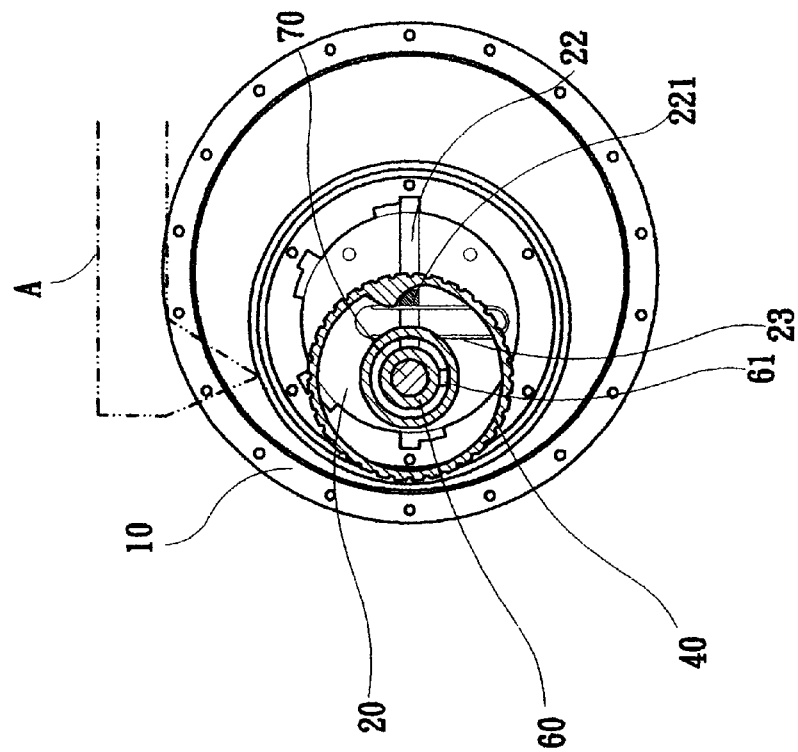
FIGS. 7A and 7B illustrate the extent of the adjustment of the eccentric distance according to the present invention.
Figure 7A:
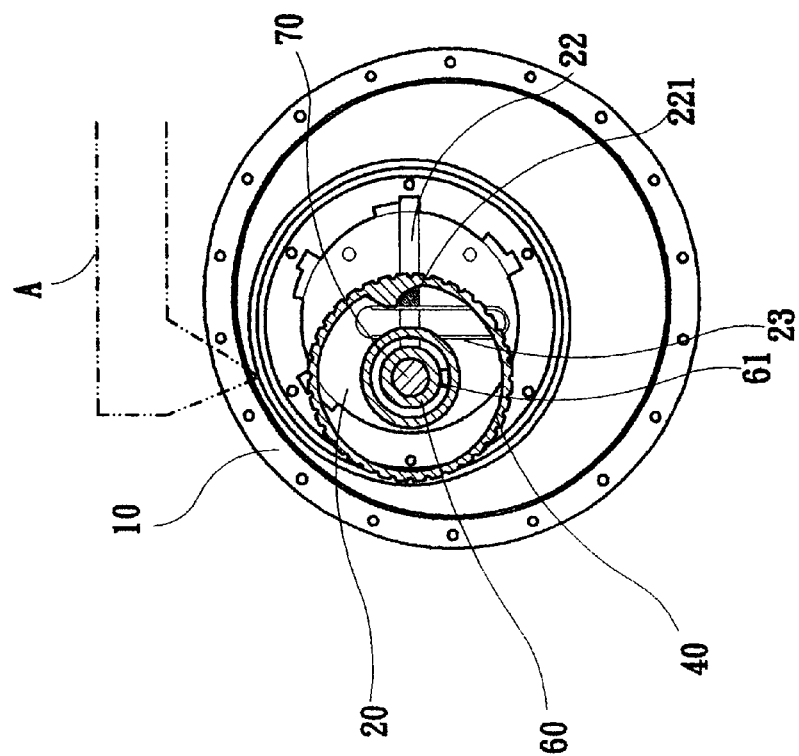

During operation, the adjustable eccentric wheel hub assembly can be alternatively set between the centered normal mode, and the three-step eccentric mode. When at the centered normal mode, as shown in FIG. 5, the wheel hub 10, the axle tube 60, the axle 70, and the core member 20 have a common center, the stop block 22 is inserted into the second slot 202 of the core member 20 and forced by the spring plate 23 into engagement with one groove 211 of the stop ring 21 to hold down the core member 20, keeping the axial center of the wheel hub 10 in coincidence with the axial center of the core member 20, and therefore the adjustment wheel 40 and the core member 20 are rotated with the wheel of the bicycle synchronously. The pawl A is turned and disengaged from the adjustment wheel 40, and the wheel of the bicycle is smoothly horizontally rotated forwards. When changing to the eccentric mode during, riding, the pawl A is released and forced into engagement with the adjustment wheel 40 (see FIG. 6A) to stop the adjustment wheel 40 from rotary motion with the wheel of the bicycle and the wheel hub 10. At this time, the wheel hub 10 is continuously rotated with the wheel of the bicycle, the guide block 41 of the adjustment wheel 40 imparts a pressure to the projecting rod 221 of the stop block 22, causing the stop block 22 to be moved away from the corresponding groove 211 of the stop ring 21 (see FIG. 6B). After the stop block 22 had been disengaged from the grooves 211 of the stop ring 21, the second axle bush 80 is driven by an external force (for example, the sprocket wheel of the bicycle) to rotate the axle tube 60 and the core member 20, causing the core member 20 to be released from synchronous rotation with the wheel hub 10. When the wheel hub 10 is continuously rotated, the spring plate 23 forces the stop block 22 outwards (see FIG. 6C), and therefore the stop block 22 is moved along one recessed portion 213 to a next groove 211 (see FIG. 6D), causing the core member 20 to be synchronously rotated with the wheel hub 10 again, and therefore the wheel of the bicycle is rotated in an eccentric manner. Thereafter, the pawl A is lifted a way from the adjustment wheel 40, and the rider can thus enjoy up and down riding of the bicycle. If desired, the eccentric mode can be adjusted further to the second stage shown in FIG. 7A, or the third stage shown in FIG. 7B. When adjusted to the third stage eccentric mode, the extent of eccentric condition reaches the maximum status, and the stroke of the up and down movement of the bicycle reaches the maximum range.

It is to be understood that the drawings are designed for purposes of illustration only, and are not intended for use as a definition of the limits and scope of the invention disclosed.

What the invention claimed is:

1. An adjustable eccentric wheel hub assembly installed in a wheel of a vehicle for enabling the wheel to be rotated eccentrically, comprising:

a wheel hub, said wheel hub comprising two outward mounting flanges raised around the periphery thereof at two sides and fastened to the wheel of the vehicle, an eccentrically axially extended, stepped through hole, said stepped through hole defining a first step and a second step, a plurality of mounting holes equiangularly spaced on said first step, and two annular grooves respectively disposed at front and rear sides thereof around said stepped through hole;

a core member inserted into the stepped through hole of said wheel hub, said core member comprising a through hole axially eccentrically extended through two opposite end walls thereof; a locating groove axially extended through the two opposite end walls and disposed in communication with the through hole of said core member, an outward flange raised around the periphery thereof near one end and stopped at the second step of said wheel hub, a first slot and a second slot respectively formed on one end wall thereof, and a plurality of mounting holes axially extended through the two opposite end walls thereof, said first slot cutting perpendicularly through said second slot, said second slot extending radially from the through hole of said core member;

a stop block slidably inserted in the second slot of said core member, said stop block having a projecting rod perpendicularly extended from one end thereof;

a substantially U-shaped spring plate mounted in the first slot of said core member;

a stop ring supported on the outward flange of said core member, said stop ring comprising four recessed portions equiangularly spaced around an inner diameter thereof, four axial grooves respectively disposed in said recessed portions, and a plurality of axially extended mounting holes respectively fastened to the mounting holes of said wheel hub;

a right dust cover press-fitted into one annular groove of said wheel hub to hold down said stop ring on said core member, said right dust cover comprising an eccentric hole aimed at the through hole of said core member, a slot extended from the eccentric hole of said right dust cover and aimed at the second slot of said core member, and a plurality of mounting holes respectively fastened to the mounting holes of said core member;

an axle tube inserted through the eccentric hole of said right dust cover and the through hole of said core member, said axle tube comprising two outer threads at two distal ends thereof, and a longitudinal key slot;

a key mounted in the longitudinal key slot of said axle sleeve to secure the axle sleeve in said core member;

an adjustment wheel mounted around said axle tube and supported on said right dust cover, said adjustment wheel comprising a guide block in an inner diameter thereof and a toothed periphery;

a first axle bush threaded onto one outer thread of said axle tube and partially engaged into the inner diameter of said adjustment wheel, said first axle bush comprising a plurality of equiangularly spaced mounting holes adapted for fastening to the disk brake of the bicycle, and an axle bearing chamber;

an axle inserted through said axle tube;

a core cap mounted around said axle tube and covered on one end of said core member, said core cap comprising a plurality of mounting holes respectively fastened to the mounting holes of said core member;

a left dust cover mounted around said axle sleeve and press-fitted into one annular groove of said wheel hub and fixedly fastened to the mounting holes of said core member;

a second axle bush threaded onto one outer thread of said axle tube, said second axle bush comprising an axle bearing chamber;

two axle bearings respectively mounted in the axle bearing chamber of said first axle bush and the axle bearing chamber of said second axle bush;

two nuts respectively threaded onto two the threaded opposite ends of said axle; and two washers respectively mounted on said axle and retained between said axle bearings and said nuts, wherein when turning a pawl of the bicycle into engagement with said adjustment wheel to stop said adjustment wheel from rotary motion with the wheel of the bicycle and said wheel hub during running of the bicycle, said wheel hub is continuously rotated with the wheel of the bicycle, the guide block of said adjustment wheel forces said stop block away from the grooves of said stop ring, and said spring plate forces said stop block outwards into engagement with one groove of said stop ring, causing said core member to be synchronously rotated with said wheel hub again, and therefore the wheel of the bicycle is rotated in an eccentric manner.

\* \* \* \* \*